United States Patent [19]

Vielmo et al.

[11] Patent Number: 4,531,063
[45] Date of Patent: Jul. 23, 1985

[54] SYSTEM FOR RECOVERING WAVE ENERGY AND ITS CONVERSION INTO USEFUL ENERGY

[76] Inventors: Paolo Vielmo, Via Podestarile 17, Padova; Attilio Brighenti, Cannareggio 1040, Venice; Antonio Blandino Alamia, Via Ronzinella 77, Mogliano Veneto (Treviso), all of Italy

[21] Appl. No.: 404,387

[22] Filed: Aug. 2, 1982

[30] Foreign Application Priority Data

Aug. 18, 1981 [IT] Italy ............................... 23544 A/81

[51] Int. Cl.³ ..................... F03B 13/12; F03B 13/10; F15B 11/06
[52] U.S. Cl. ........................................ 290/53; 60/327; 405/76; 415/2 R; 416/85
[58] Field of Search ............ 290/53, 54, 42, 43; 405/76, 77, 78, 79; 415/2 R, 2 A; 416/85, 86, 87, 90 R; 60/327, 719

[56] References Cited

U.S. PATENT DOCUMENTS

| | | | |
|---|---|---|---|
| 3,965,364 | 6/1976 | Gustafson et al. | 290/53 |
| 4,193,265 | 3/1980 | Ootsu | 290/54 X |
| 4,274,009 | 6/1981 | Parker, Sr. | 290/43 |
| 4,277,690 | 7/1981 | Noren | 290/53 |
| 4,327,296 | 4/1982 | Weyers | 290/53 |
| 4,340,821 | 7/1982 | Slonim | 290/53 |
| 4,352,023 | 9/1982 | Sachs et al. | 290/42 |
| 4,363,213 | 12/1982 | Paleologos | 290/53 X |
| 4,369,374 | 1/1983 | Sandgänger | 290/53 |
| 4,375,151 | 3/1983 | French | 290/53 X |
| 4,392,061 | 7/1983 | Dubois et al. | 290/53 |
| 4,398,095 | 8/1983 | Ono | 290/53 |
| 4,403,154 | 9/1983 | Reale et al. | 290/53 |
| 4,404,490 | 9/1983 | Taylor et al. | 290/53 X |
| 4,405,866 | 9/1983 | Masuda et al. | 290/53 |
| 4,423,334 | 12/1983 | Jacobi et al. | 290/42 X |
| 4,447,740 | 5/1984 | Heck | 290/53 |

FOREIGN PATENT DOCUMENTS

| | | | |
|---|---|---|---|
| 0036586 | 9/1981 | European Pat. Off. | 290/42 |
| 3015810 | 10/1981 | Fed. Rep. of Germany | 290/42 |
| 3017257 | 11/1981 | Fed. Rep. of Germany | 290/42 |
| 3043138 | 7/1982 | Fed. Rep. of Germany | 290/53 |
| 3116740 | 11/1982 | Fed. Rep. of Germany | 290/53 |
| 0049075 | 3/1982 | Japan | 290/53 |
| 2002052 | 2/1979 | United Kingdom . | |
| 1601060 | 10/1981 | United Kingdom | 290/42 |
| 2084259 | 4/1982 | United Kingdom | 290/42 |

Primary Examiner—A. T. Grimley
Assistant Examiner—Terry Flower

[57] ABSTRACT

A system for recovering wave energy and its conversion into mechanical and electrical energy, comprising a pickup member kept in a submerged position and one or more resilient lines (extensible flexible hoses) connected mechanically at one end to the pickup member and at the other end to an anchor fixed to the sea or lake bed. The interior of the resilient lines are in communication at one end with a gas-filled accumulator vessel and are blind at the other end, and are also filled with an incompressible fluid. One or more turbines and displacement engines convert the pressure and kinetic energy of the incompressible fluid into mechanical energy. The turbines are coupled to an electric generator for generating electrical energy utilizing the mechanical energy.

32 Claims, 12 Drawing Figures

SYSTEM FOR RECOVERING WAVE ENERGY AND ITS CONVERSION INTO USEFUL ENERGY

BACKGROUND OF THE INVENTION

This invention relates to a system for recovering wave energy and its conversion into useful energy. Many systems are known for recovering wave energy, including for example that described in British patent application No. 2,002,052.

The system described in said British patent application is based on the use of an extensible flexible hose filled with an incompressible fluid and connected at one end to the sea or lake bed and at the other end to a buoy.

When the buoy is struck by a wave, the hose is put into tension and its internal volume reduces, so that the incompressible fluid contained in its interior is urged outwards under pressure.

In contrast, when the wave has passed, the hose relaxes, and its internal volume becomes normal so that further incompressible fluid is able to enter from the outside.

The incompressible pressurised fluid expelled from the hose possesses energy which can be utilised in a useful manner. The problem to be solved is the utilisation of the energy of said incompressible fluid, and it is precisely this which is not adequately solved in the British patent application.

SUMMARY OF THE INVENTION

A system has been found, and constitutes part of the subject matter of the invention, for converting the pressure energy of the incompressible fluid expelled from flexible hoses. The system according to the present invention comprises the following elements:

(a) a pickup member kept in a submerged position
(b) one or more resilient lines (extensible flexible hoses) directly or indirectly connected mechanically at one end to said pickup member and at the other end to means fixed to the sea or lake bed, the interior of said resilient lines being in communication at one end with an accumulation member and being blind at the other end, and being also filled with an incompressible fluid
(c) an accumulation member constituted by a gas-filled vessel
(d) one or more means for converting the pressure and kinetic energy of the incompressible fluid into mechanical energy
(e) possible means for interrupting communication with the accumulation member
(f) means for generating electrical energy utilising the mechanical energy.

In particular, in a preferred embodiment of the system according to the present invention, the interior of the resilient lines is in communication with the accumulation member by way of a connection channel and still more preferably said connection channel is partly flexible and partly rigid, the flexible part being external to the pickup member and the rigid part being internal thereto. The accumulation member is generally and preferably inside the pickup member, but the system can function equally well with the accumulation member located outside the pick-up member. The means for converting the pressure and kinetic energy of the incompressible fluid in the system into mechanical energy are chosen preferably from turbines, in particular axial turbines, or displacement engines, in particular of variable geometry.

Said turbines or displacement engines are preferably connected substantially into the rigid connection channel. In the system heretofore described, there is provided only one high pressure accumulation member into which the incompressible fluid enters when urged by the resilient lines under tension, and from which the incompressible fluid emerges to again flow to the resilient lines when these latter are in their relaxed state.

A modification is possible in which the incompressible fluid flows from a high pressure accumulation member and back to the resilient lines not directly but by way of a further low pressure accumulation member.

In this modification, the means for converting the pressure and kinetic energy of the incompressible fluid into mechanical energy are connected into the communication line between the two accumulation members.

The low pressure accumulation member discharges the incompressible fluid into the resilient lines when these are in their relaxed state, whereas these latter when in a state of tension feed the incompressible fluid into the high pressure accumulation member.

BRIEF DESCRIPTION OF THE DRAWINGS

FIG. 1A is a detail of area A in FIG. 1.

DESCRIPTION OF THE PREFERRED EMBODIMENTS

The system according to the present invention is described hereinafter with reference to the accompanying figures which show some preferred but non-limiting embodiments of the system according to the invention.

Figure 1:
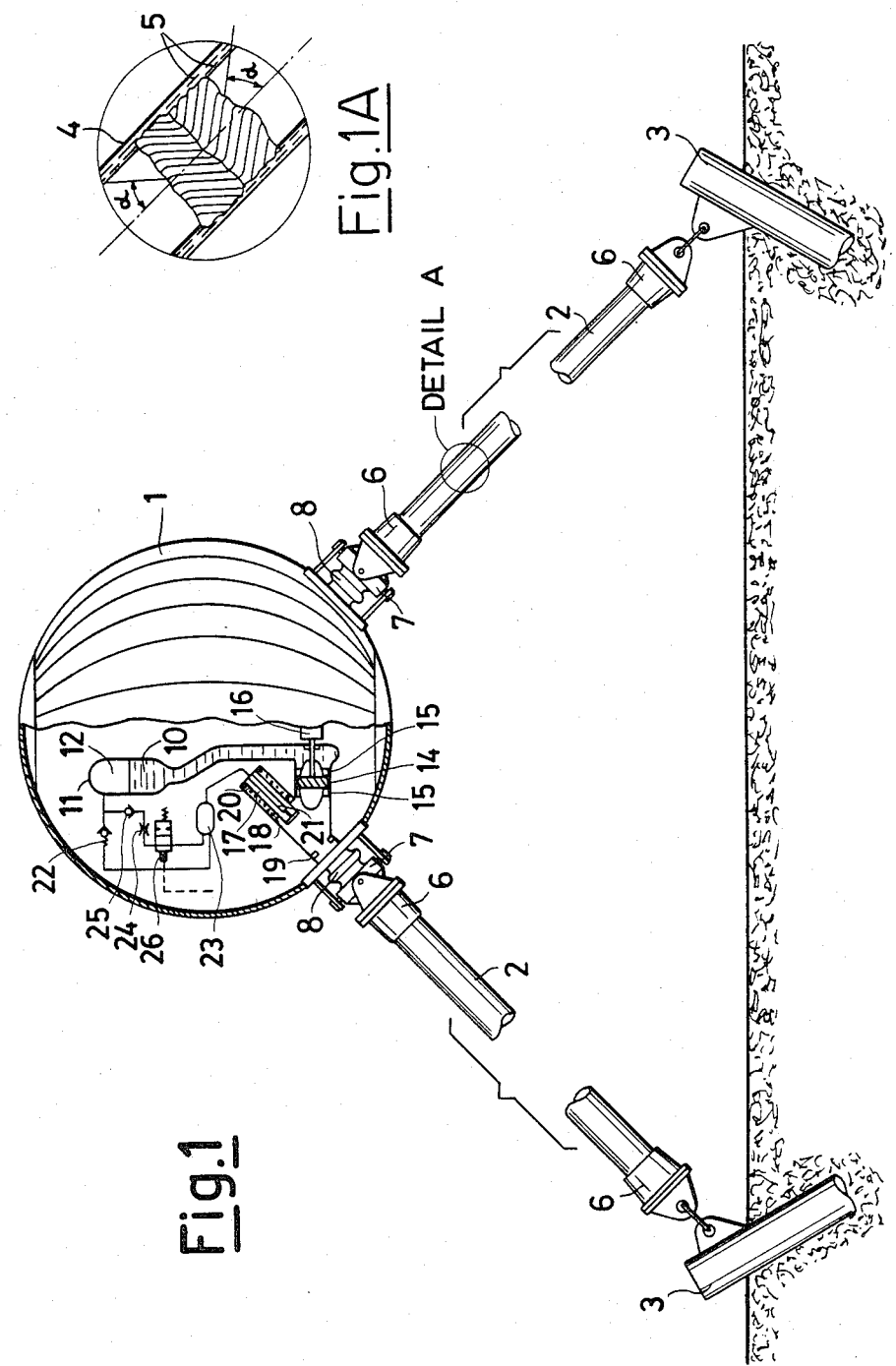
FIG. 1 is a diagrammatic view of the system according to the present invention.

The system illustrated diagrammatically in FIG. 1 is constituted by a pickup member 1 which, in a preferred configuration, is of spherical shape (but can be constructed in various structural forms such as cylindrical of horizontal or vertical axis), and is kept in a submerged position at a suitable distance from the free surface of the mass of water in which it operates, and which hereinafter will be defined as "sea", by one or more resilient lines 2 (two in number in the illustrated configuration) connected to the sea bed and to suitable fixed anchorage points. Said anchorage points can be in the form of sunken piles 3 as in the illustrated solution, or sinker blocks, or again in the form of fixed structures which are elevated from the sea bed but are either anchored to it or are stable on it by virtue of gravity. Said resilient lines can also be connected to said anchorage points either directly or by way of taut structural elements (metal cables or tubes) which can be considered practically inextensible.

The described anchorage lines are kept under tension by the effect of a buoyancy reserve situated in the pickup member itself. This can be attained by various types of constructions using various structural materials known to current technology, including steel, reinforced concrete and reinforced plastics, but this does not constitute a limitation to the present invention.

The resilient connection lines are formed from a hose constructed of a material of low modulus of elasticity but high resilience 4 (such as natural and synthetic elastomers) reinforced by fibres or filaments would helically in two or more layers of opposite winding angle, so as to be embedded in the hose in a torsionally stable manner.

Said reinforcement filaments or fibres, represented diagrammatically in the detailed view A of FIG. 1 and indicated by 5, are constructed of a material of high modulus of elasticity (such as steel, polyester, polyamide or polyaramide fibres), which can be considered practically inextensible.

Each hose or resilient line is provided at its end with a termination 6, to which the reinforcement filaments or fibres are anchored, and to which the hose wall is connected in a water-tight manner.

One of the terminations of each line, namely the upper one in the system configuration described herein, is connected mechanically to the pickup member by means of a universal joint 7. Said termination also comprises an opening which communicates by way of a flexible bellows hose 8 with the hydraulic conversion circuit disposed inside the pickup member and which is described hereinafter.

The lower termination in the described system configuration is blind and is connected mechanically to the anchorage points.

The winding angle of the reinforcement fibres of the resilient line, measured with respect to a generating line of the hose, is less than 57.74° as indicated in the detailed FIG. 1A.

As the upper end of the hose is connected to the pickup member, said line is subjected to the motion of this latter. By virtue of the particular geometrical structure of the hose and of the reinforcement fibres, when the resilient line is elongated its internal volume reduces, whereas when it contracts its internal volume increases.

Figure 2:
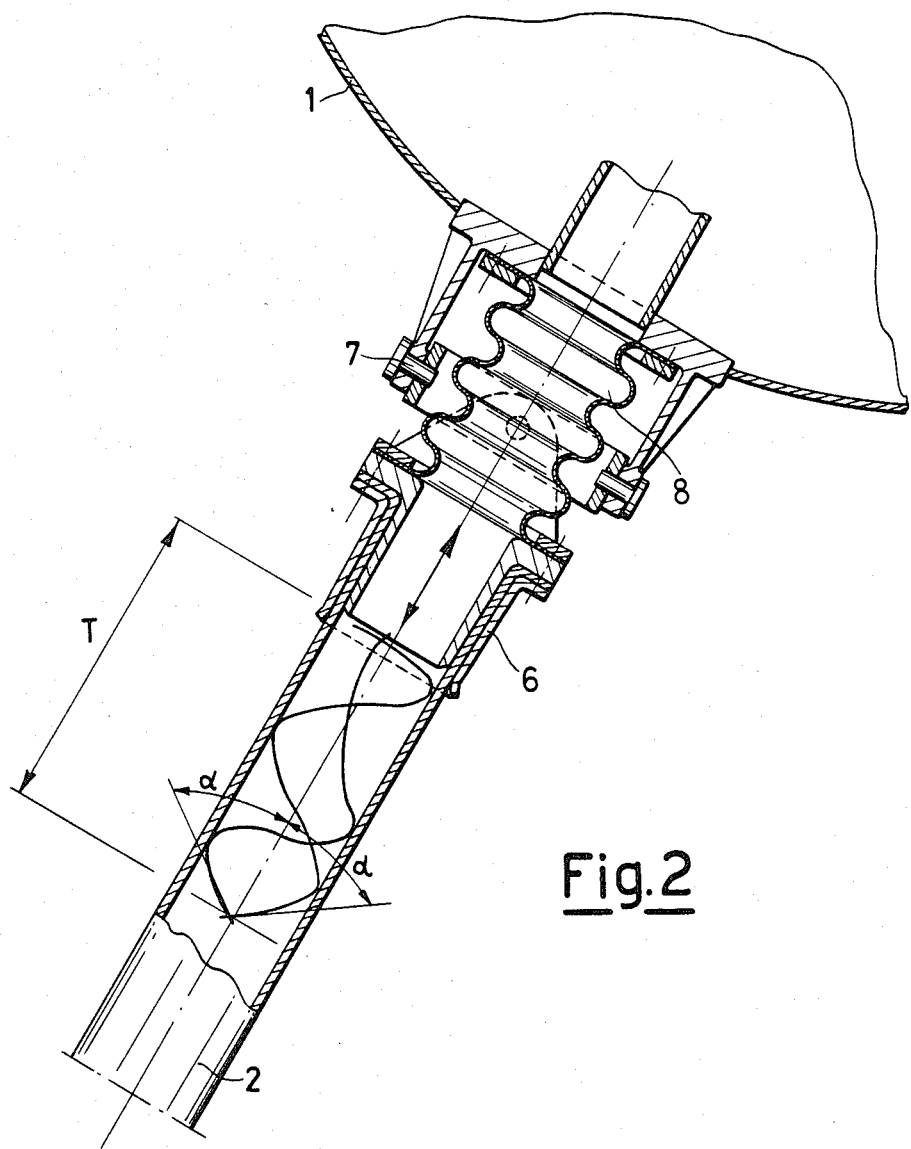
FIG. 2 is a diagrammatic view of the connection of the hose to the pick-up member.

Because the diameter of each resilient line varies during the elongation and contraction motion, the terminal portions of the resilient lines are formed as illustrated in FIG. 2 in order to prevent mechanical stress concentration and thus possible wear and/or fatigue of the hose structure at the structure terminations.

In the end portions of the resilient lines, the reinforcement fibres or filaments have a winding angle which varies from the value α characteristic of the hose, to the value zero. This means that they become parallel to the hose generating line at the ends to which they are anchored.

A further reinforcement layer provided only in the terminal hose portion indicated by T, is laid above the preceding and has a winding angle variable from the value α to 90°, i.e. orthogonal to the hose generating lines as indicated diagrammatically in FIG. 2, showing only two reinforcement fibres. This figure also diagrammatically shows the configuration of the connection of the hose 2 to the pickup member 1 by means of the terminals 6, the universal joint connection device 7 and the flexible bellows hose 8.

The purpose of the universal joint and flexible bellows hose portion is to allow the pickup member to rotate relative to the axis of the resilient lines without subjecting the hose/termination connection to bending.

Figure 3:
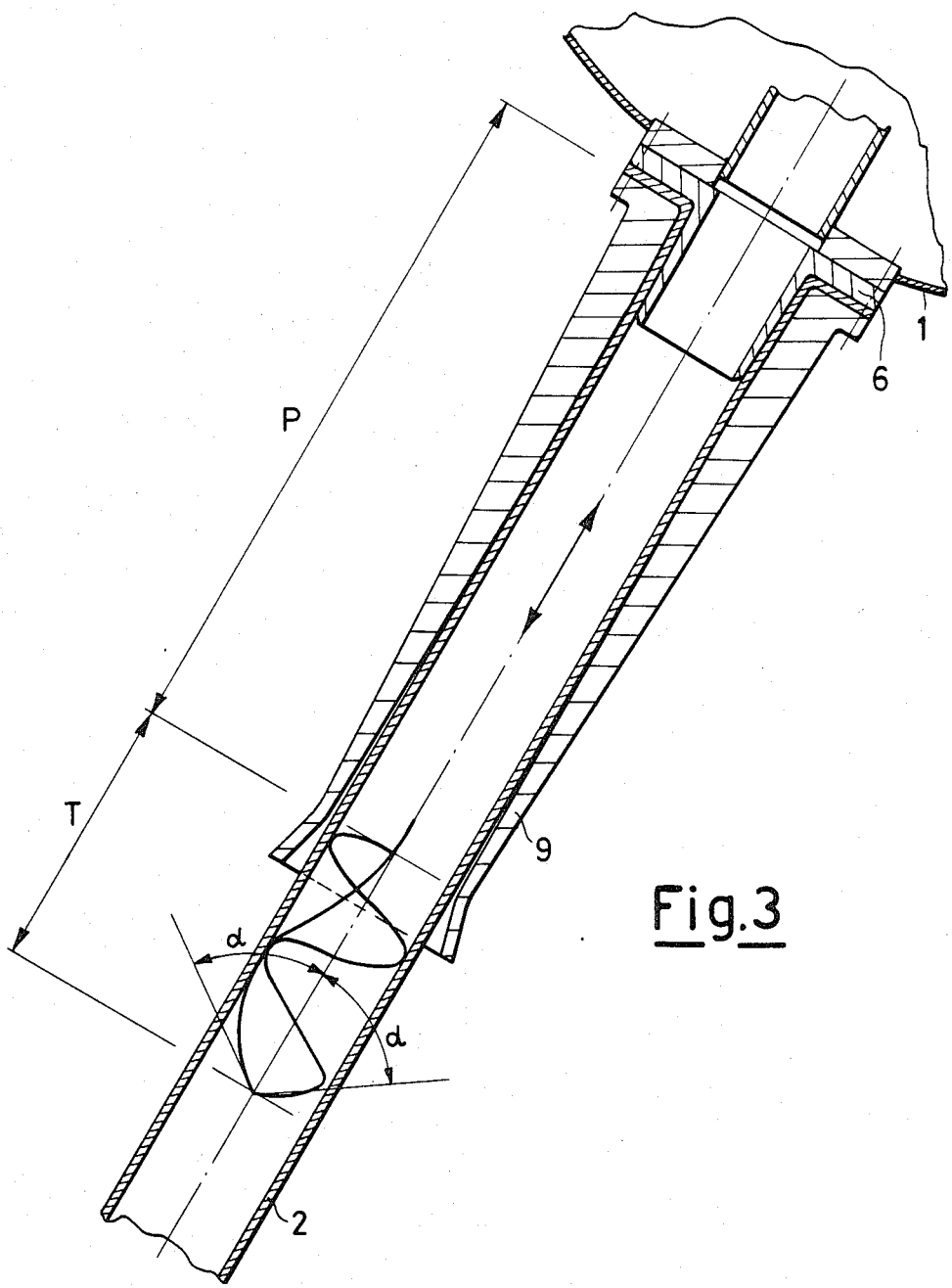
FIG. 3 is a diagrammatic view of an alternative configuration of the view in FIG. 2.

An alternative configuration of this constructional detail is shown in FIG. 3.

The resilient line or hose 2 is connected rigidly to the pickup member 1 by means of the terminations 6, and over a portion indicated by P is contained in a tube 9 of which the thickness reduces in an outward direction and which is of flexural stiffness, and is itself rigidly fixed to the pickup member 1.

By virtue of the variable flexibility of this structural element, the pickup member can rotate relative to the resilient line as this latter is prevented from assuming radii of curvature incompatible with its structural strength characteristics. Within the flexible element 9, the hose 2 comprises reinforcement fibres or filaments disposed at 0° and 90°. In the portion T external to said element, the winding angle passes to the value α as described heretofore.

The effect of the transition of the reinforcement fibre winding angle in the portion indicated by T is that axial and transverse deformations of the hose wall allowed by the structure consisting of the reinforced fibres inclined at an angle α are progressively contained, and are prevented at the connection to the rigid terminations, at which the hose wall and reinforcement are anchored. In this manner, local stress concentrations at the edge of the termination are prevented.

As shown in the basic functional diagram of FIG. 1, each resilient connection line is filled with a practically incompressible fluid 10, and is connected by way of the upper termination to a pressure vessel or accumulator 11 in which a suitable quantity of gas 12 is contained under pressure.

The resilient line or hose is therefore kept under pressure. Because of the helical geometry of the reinforcement fibres, this pressure can be balanced only by a traction force which constitutes the axial reaction of this resilient connection line.

The connection lines of this type (one or more in number) together balance the buoyancy reserve of the pickup member when under static conditions.

As the length variation of each connection line produces a variation in the internal volume thereof and thus movement of the fluid 10 contained therein from/to the accumulator 11, this length variation produces a variation in the volume of gas 12 in the accumulator and thus in the pressure in the accumulator itself and in the hose. The effect of this pressure variation and of the variation in the geometry of the hose reinforcement is a variation in the force which the resilient connection line 2 exerts at its ends.

By correctly choosing the system parameters (mainly the effective diameter of the resilient connection lines, their length, their maximum allowable elongation, the winding angle of the reinforcement fibres, the gas volume in the accumulators, and the mechanical characteristics of the materials used), it is possible to construct connection lines which have the required interdependence between elongation and reaction force (resilient characteristic), and thus the required dynamic behaviour of the entire energy pickup system in relation to its mass characteristics and to its interaction with the wave motion fluid by virtue of its movements.

The mechanical energy (kinetic and elastic potential) acquired by the pickup member at the expense of the energy of the wave motion field and by the effect of the pressure which the moving water exerts on it, is converted in accordance with one or more outline functional and constructional schemes which are described hereinafter.

Figure 4:
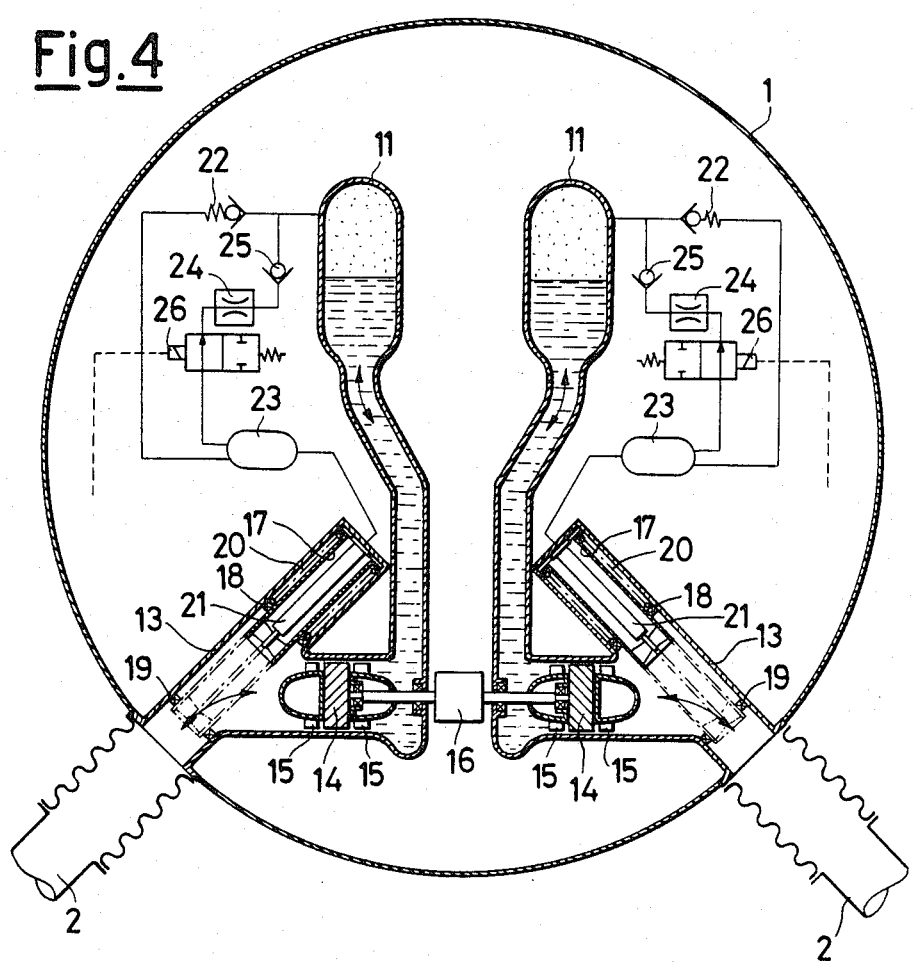
FIG. 4 is a diagrammatic view of the system for converting the wave motion into mechanical energy.

A first preferred functional scheme, shown in FIG. 4 and relating to the use of two resilient connection lines for the pickup member, but which can be extended likewise to the case of a single or more than two lines, provides for inserting into the hydraulic circuit connecting each resilient line 2 to the accumulator 11 an axial hydraulic turbine 14 which operates with a fluid stream suitably directed by static guide vanes or distributors 15 which precede and follow it whatever the direction of motion of the fluid striking it (in the reciprocating motion of the pickup member). These static guide vanes direct the motion of the fluid to the turbine in a purely axial direction (according to a preferred functional scheme).

The turbines relative to the various resilient lines are coupled directly (in accordance with the scheme of FIG. 4) or, more generally, by rotary couplings to an electric generator 16.

The flow of drive fluid to the turbine can be intercepted by a valve constituted by a shut-off cylinder 17 which slides axially and engages at the end of its stroke against seals 18 and 19 to close the connection between the resilient lines 2 and the rest of the circuit. Under these conditions, the pickup system behaves as a rigidly constrained system, and is able to survive waves having a height and energy which are considerably greater than normal operating values.

Said shut-off cylinders are opposed by a preset spring 20 and are operated by a pneumatic cylinder 21 fed by way of a circuit constituted by a first preset non-return valve 22, a suitable pneumatic buffer vessel 23, a restriction 24 and a second non-return valve 25 disposed in a circuit such as that of FIG. 4. When the amplitude of the pickup member motion and thus the maximum pressure in the accumulator (gas-filled vessel) exceed a predetermined value, the pressurised air passes through the valve 22 to the pneumatic buffer vessel 23 and thus operates the actuator cylinder 21 which acts against the preset spring 20 to close the flow of drive fluid by an extent controlled dynamically by the restriction 24 which, during that stage of the cycle in which the pressure in the pneumatic buffer vessel 23 exceeds the pressure in the accumulator 11, allows the air of the actuator cylinder circuit to pass through the non-return valve 25 to the accumulator 11. In this manner, there is a self-regulating action by means of which the maximum amplitude of the system oscillations and thus the maximum extent of mechanical stress in the connection lines are limited.

By preventing discharge of the pneumatic cylinder through the restriction 24, a remotely controlled solenoid valve 26 allows total closure of the valves controlling the amplitude of oscillation (non-return valves) and thus allows the pickup system to be blocked.

The energy of the pickup member and thus of the incompressible fluid is transferred alternately from the resilient lines and their respective accumulators to the turbine by controlling the angle of incidence of the turbine blading so as to attain a hydrodynamic drive action on the rotor and thus on the electric generator by virtue of the drive fluid.

Figure 5:
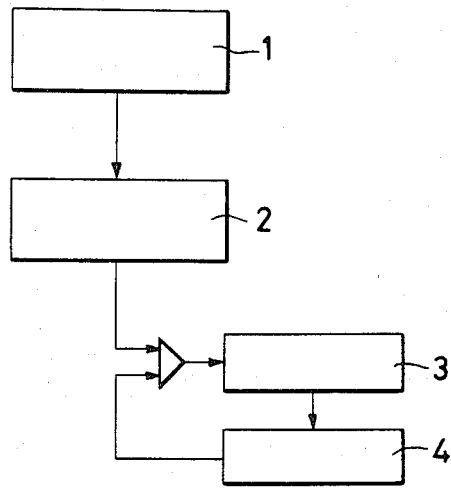
FIG. 5 is a block diagram of the mechanical operating scheme for controlling the angle of incidence of the rotor blading.

In general, this control of the angle of incidence of the rotor blading can be effected by a mechanical operating scheme which is conventional in the field of hydraulic machine technology and which uses pneumatic, hydraulic or electromechanical operating systems based on a block diagram of the type shown by way of example in FIG. 5. The reference numeral 1 indicates a measuring system for the flow through the turbine both in terms of value and direction of movement. 2 indicates a processor for processing the instantaneous angle of incidence of the turbine blading. 3 indicates an actuator for setting the angle of incidence of the turbine blading. 4 indicates a measuring device for measuring the angle of incidence of the turbine blading.

A detailed description of such a system is not essential. However, it should be noted that the flow rate through the turbine and thus the rate at which the drive fluid strikes it (knowing the flow area) can be measured either by using known measuring methods for the flow of a fluid through a pipe, or by measuring the mechanical (and thus geometrical) characteristics of the resilient line as a function of time. This can be done by taking time-related measurements of the state of tension of the reinforcement fibres using an extensometer.

The processor for processing the angle of incidence of the turbine blading can be a digital microprocessor.

Figure 6:
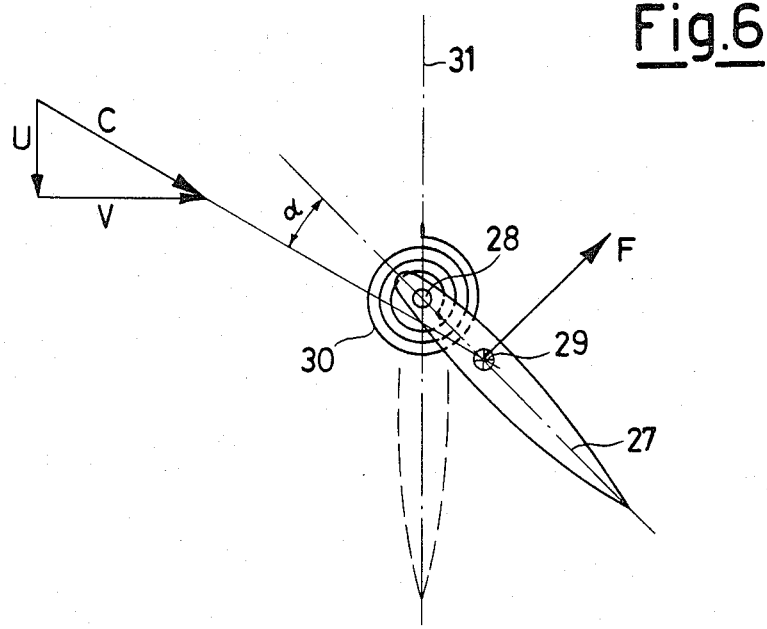
FIG. 6 is a diagrammatic outline of a preferred scheme of controlling the angle of incidence of the blading.

In a simplified preferred scheme, the angle of incidence of the blading is controlled in accordance with the outline diagram of FIG. 6.

Each turbine blade 27 is hinged on an axis 28 which is normal to the axis of rotation of the rotor and passes in proximity to the leading edge of the blade, and is therefore disposed more forward (in the direction of advancement) than the hydrodynamic pressure centre 29 of the blade.

The blade is also rotationally restrained resiliently by a spring 30 which when there is no external force keeps it in a plane normal to the axis of rotation of the rotor. The pressure of a motion field with an apparent velocity C (combination of the traversing velocity V and the rotational velocity U) striking the blade generates a hydrodynamic action F and thus a torsional moment about the axis of rotation 28, which is opposed by the reaction spring 30. There is thus a drive action directed always in the same direction whatever the direction in which the turbine plane is traversed by the drive fluid.

Figure 7:
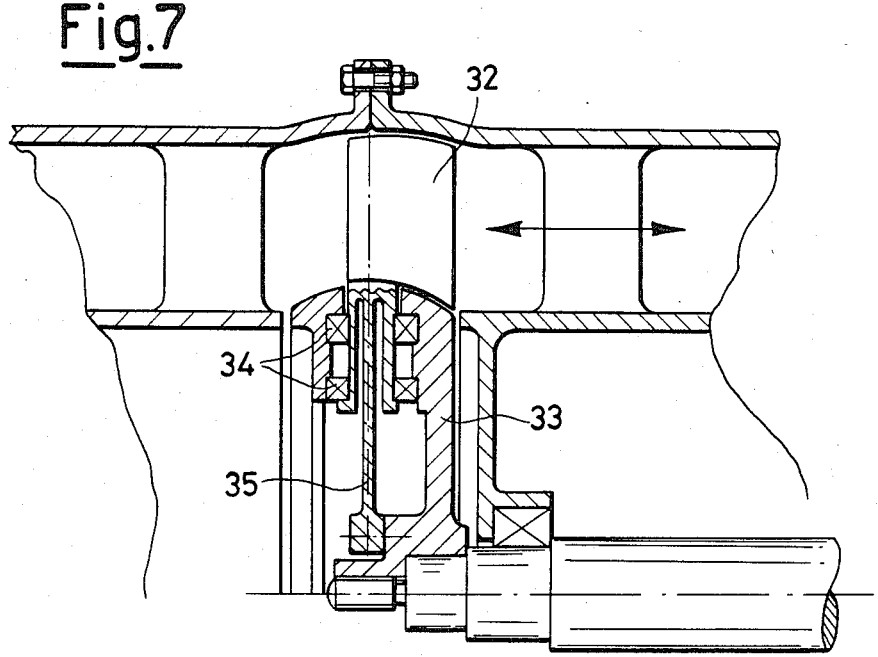
FIG. 7 is a diagrammatic view of the resilient rotational restraint system for the turbine blades.
Figure 8:
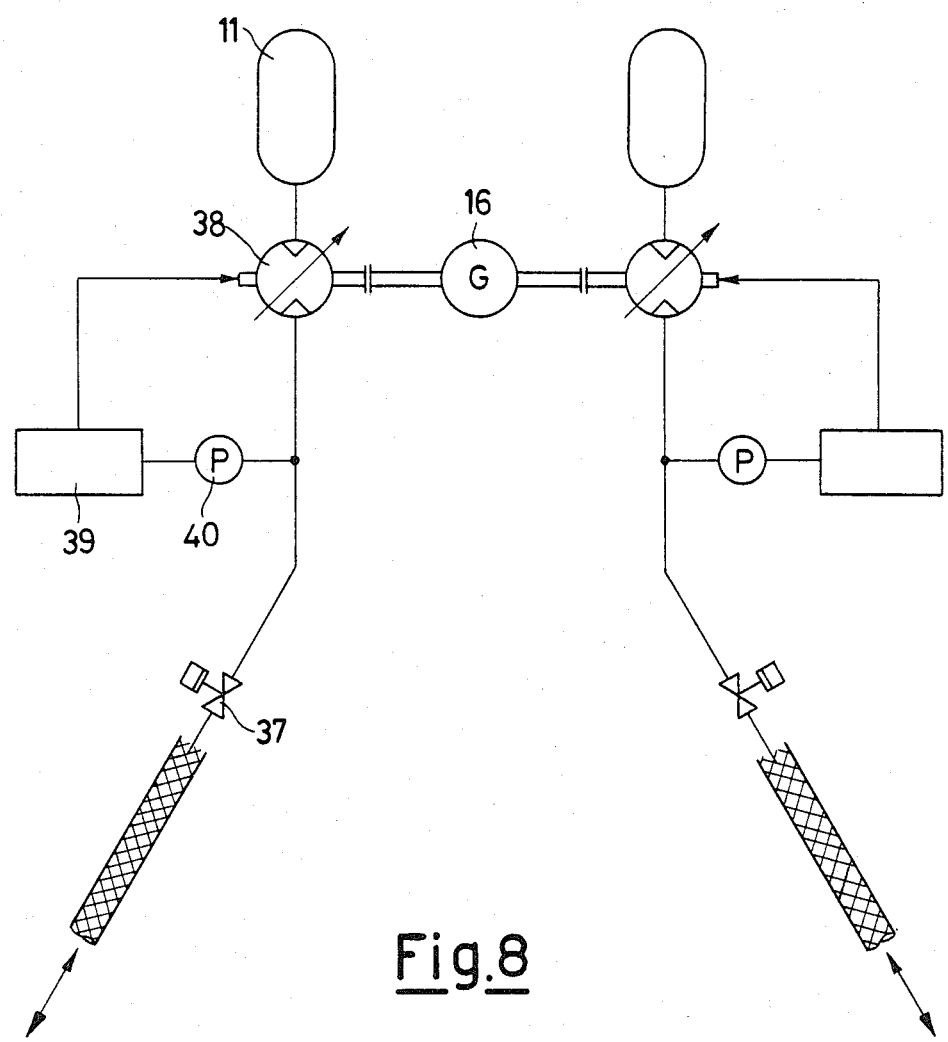
FIG. 8 is a schematic diagram of another embodiment of the invention for converting mechanical energy into electrical energy.

In addition, under such conditions the electric generator can operate at a practically constant rotational speed. FIG. 7 shows a possible constructional scheme for the resilient rotational restraint system for the turbine blades. Each blade 32 is rotatably connected to the rotor 33 by the bearings 34, and is also rigidly connected to the torsion bar 35, which at its other end is connected to the rotor by a demountable coupling, said torsion bar functioning as a spring. According to a further outline scheme for converting the mechanical energy of the pickup member into electrical energy shown in FIG. 8, each resilient line is connected to a variable displacement engine 38 and thus to the accumulator 11 by the oscillation amplitude control valve 37, which has already been described (17 and associated reference numerals of the circuit of FIG. 4).

The engine displacement is controlled by a hydraulic or electrohydraulic system 39 which processes the signal of a flow measuring device 40 and provides a suitable command to the engine displacement actuation members in order to obtain the necessary energy transfer at constant speed to the generator 16 which is coupled to the engine by the already described schemes.

The design of the hydraulic or electrohydraulic control system for the engine throughput and consequently for the energy conversion does not form part of the present invention, in that such systems already form part of the technology of devices of this type.

Alternative system configurations in which the conversion system is disposed on the sea bed or in proximity to the anchorage point constitute a possible alternative embodiment of the invention. In this case, the pickup member is connected only mechanically and not hydraulically to the resilient line.

Figure 9:
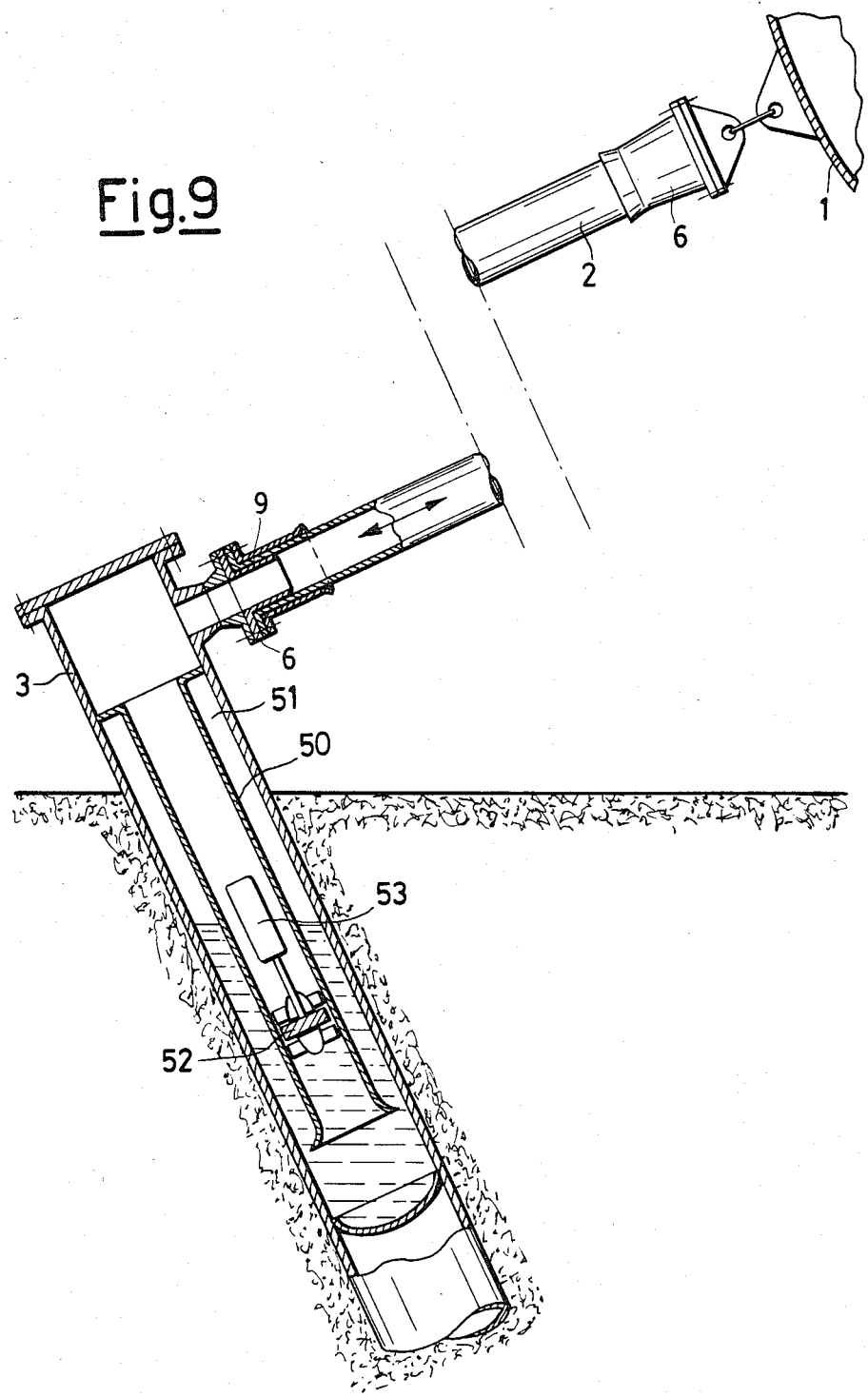
FIG. 9 is a diagrammatic view of a further embodiment in which the system for the conversion of energy is disposed on the sea bed.

FIG. 9 shows a system configuration based on the aforegoing which relates to a conversion system analogous to that shown in FIG. 7.

The resilient line 2 is connected to the pickup member 1 by means of the upper termination, which is blind. In this case, the lower termination is mechanically and hydraulically connected to the anchorage structure 3, comprising a flow opening which connects it by way of the conduit 50 to the pneumatic buffer vessel (accumulation member) 51 containing gas under pressure. In this manner, the same functional scheme as described heretofore is attained by a different arrangement of system components. A hydraulic turbine 52 situated in the conduit 50 and connected to the electric generator 53 performs the required conversion of the hydraulic mechanical energy into electrical energy.

Figure 10:
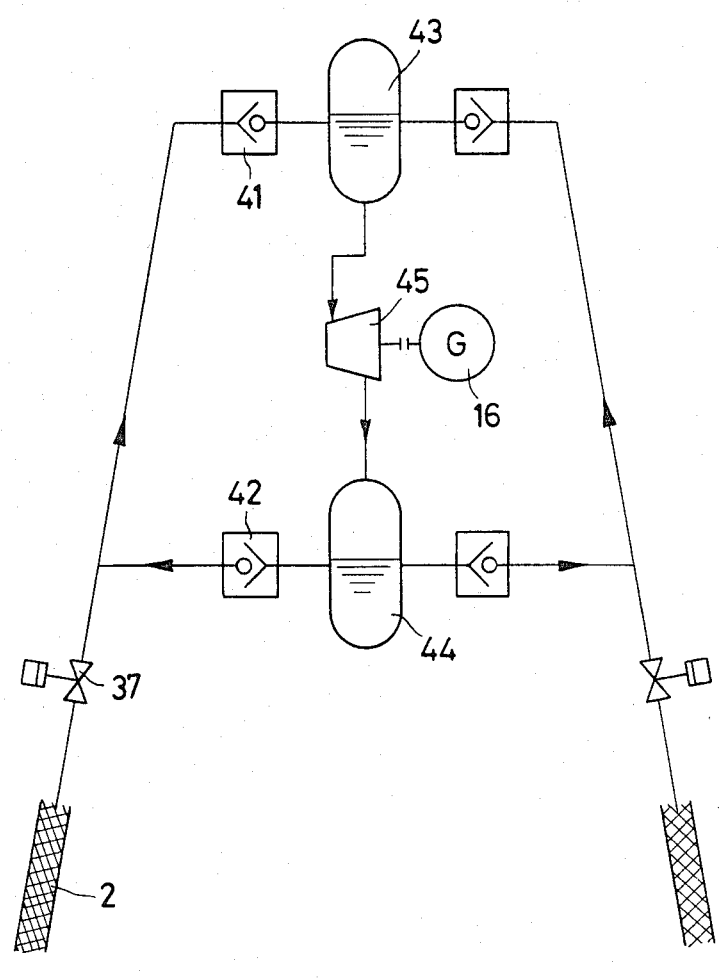
FIG. 10 is a schematic diagram of another embodiment for converting mechanical energy into electrical energy.

A further scheme for converting the mechanical energy of the pickup member into electrical energy is represented by FIG. 10. Each resilient line 2 is hydraulically connected to a high pressure accumulator 43 by way of the already described valve 37 for controlling the oscillation amplitude, and by way of a non-return valve 41. It is connected to the low pressure accumulator 44 by way of a further non-return valve 42.

The direction of opening of the valves is such as to connect the generic resilient line to the high pressure accumulator as the line extends, and to the low pressure accumulator as the line contracts.

The two accumulators are connected hydraulically by a hydraulic turbine 45 which is directly connected to the generator 16.

During the oscillatory motion of the pickup member, a fluid motion is generated which by the effect of the non-return valves 41 and 42 passes from the resilient line 2 to the high pressure accumulator 43, then through the turbine 45 to the low pressure accumulator 44 and again to the resilient line 2.

Figure 11:
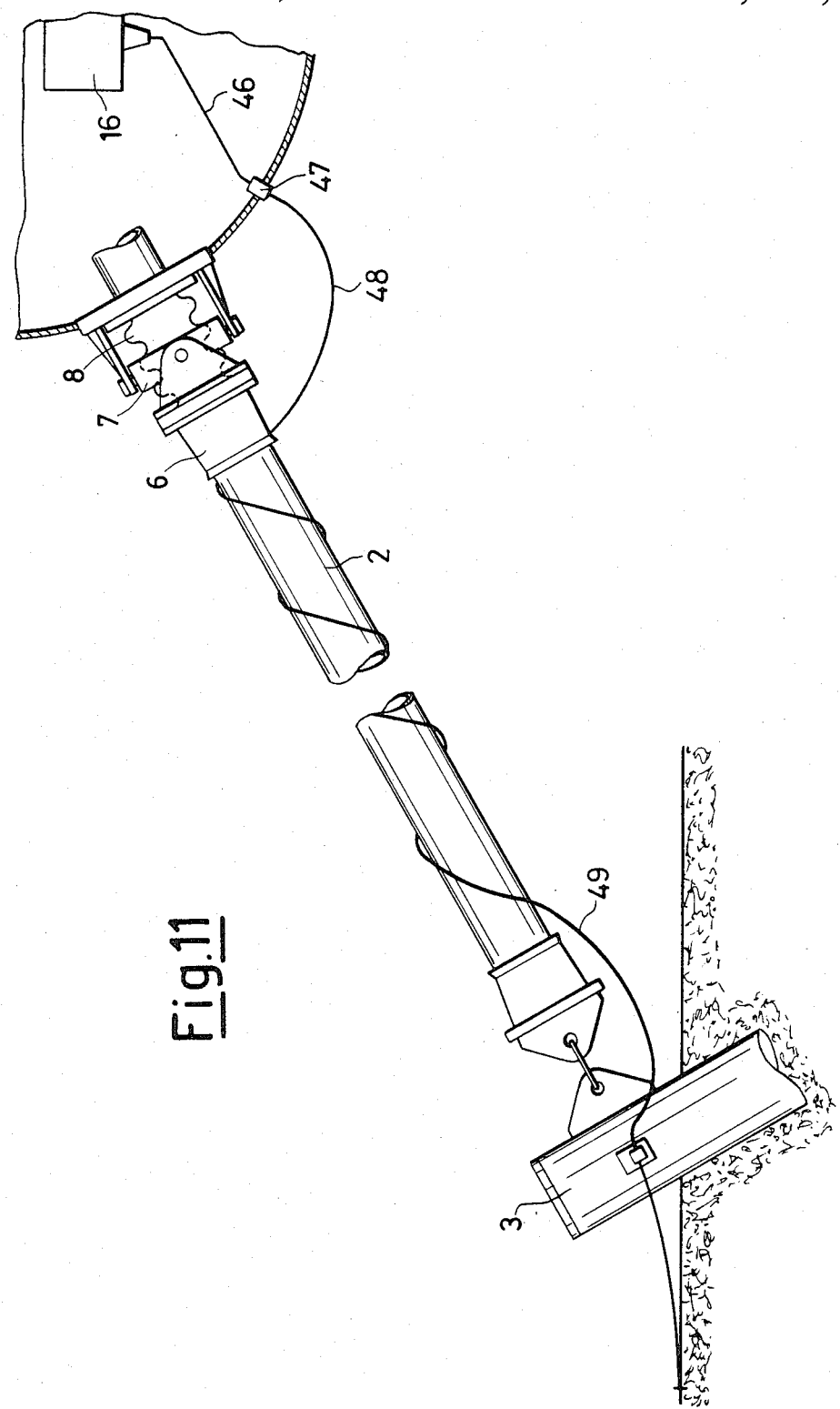
FIG. 11 is a diagrammatic view of a system for converting the electrical energy produced by the present invention.

The capacity of the two accumulators 43 and 44 absorbs the flow oscillations consequent on the alternating motion of the resilient lines, to allow an almost continuous flow through the turbine. The electrical energy can be conveyed by an electric cable supported by the pickup member and resilient line structures as shown in FIG. 11. The generator 16 is connected to an electric cable 46 which passes through the shell of the pickup member by way of a fairlead 47 for conveying the energy produced.

This cable has a free portion 48 which allows the movements of the pickup member relative to the resilient line at the level of the upper termination to take place, and is fixed to the outside of the resilient line by being wound about it at an angle which at any point is equal to the angle of the reinforcement fibres, so that it does not become subjected to mechanical stress deriving from an axial deformation or flexural state.

At its bottom, the cable comprises a further free portion 49 which is then connected to the anchorage system at the sea bed.

Figure 12:
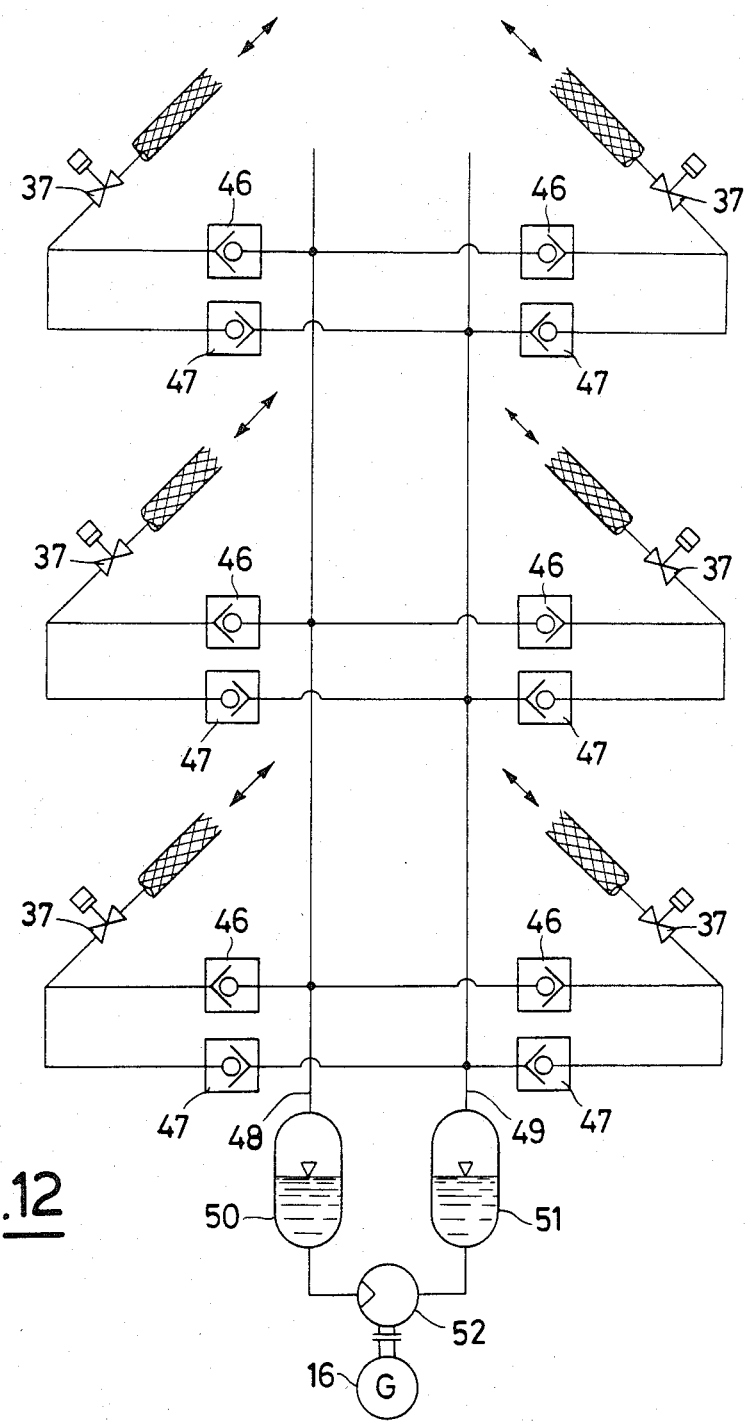
FIG. 12 is a schematic diagram of an enlarged system where the energy conversion system is disposed on the sea bed.

In a like manner, the functional scheme of the system illustrated in FIG. 10 can be extended and enlarged in the case of an energy conversion system disposed on the sea bed or in a position remote from the pickup member, as shown in FIG. 12.

Each resilient anchorage line for the pickup members, and relative to a certain number of pickup members, is fitted with the already described system 37 for controlling oscillation amplitude, and is connected by non-return valves 46 and 47 to two collection conduits 48 and 49 respectively. These are connected to two accumulators, namely a high pressure accumulator 50 and a low pressure accumulator 51 respectively, which are connected together by a hydraulic turbine 52 connected to the electric generator 16. During the oscillation motion of the pickup members, there is a flow of incompressible fluid from the resilient lines to the collection conduit 48 by way of the non-return valves 46 during the extension stage. From here the fluid flows to the accumulator 50 and through the turbine 52 to the accumulator 51, from which the fluid passes through the collection conduit 49 and non-return valves 47 to return to the resilient lines (during the contraction stage).

We claim:

1. A system for recovering wave energy and its conversion into useful energy, comprising:
   (a) a pickup member kept in a submerged position;
   (b) at least one resilient line connected mechanically at one end to said pickup member and at the other end to means fixed to the sea bed, the interior of said resilient line being in communication at one end with an accumulation member and being closed at the other end, and being also filled with an incompressible liquid;
   (c) an accumulation member constituted by a vessel filled with gas under pressure;
   (d) means for converting the pressure and kinetic energy of the incompressible liquid into mechanical energy;
   (e) means for interrupting the communication between the resilient lines and the accumulation member; and
   (f) means for generating electrical energy utilizing the mechanical energy.

2. A system as claimed in claim 1, wherein the interior of the resilient lines communicates with the accumulation member by way of a connection channel.

3. A system as claimed in claim 2, wherein the connection channel comprises a flexible part and a rigid part, the flexible part being outside the pickup member and the rigid part being inside the pickup member.

4. A system as claimed in claim 3, wherein the flexible connection channel is a bellows conduit.

5. A system as claimed in claim 1, wherein the accumulation member is inside the pickup member.

6. A system as claimed in claim 1, wherein the accumulation member is outside the pickup member.

7. A system as claimed in claim 1, wherein said means for converting the pressure and kinetic energy of the incompressible fluid into mechanical energy is a turbine.

8. A system as claimed in claim 7, wherein said tubine is an axial turbine.

9. A system as claimed in claim 8, wherein the axial turbine is preceded and followed by guide vanes or distributors.

10. A system as claimed in claim 1, wherein said means for converting the pressure and kinetic energy of the incompressible liquid into mechanical energy is a displacement engine.

11. A system as claimed in claims 7 or 10, wherein the turbine and the displacement engine are substantially connected into the rigid connection channel.

12. A system as claimed in claim 10 wherein said displacement engine is a variable displacement engine.

13. A system as claimed in claim 12, wherein the displacement of the variable displacement engine is controlled by an electrohydraulic system which processes the signal of a flow measuring device and provides the command to the displacement actuation members.

14. A system as claimed in claim 1, wherein the pickup member is of spherical shape.

15. A system as claimed in claim 1, wherein the pickup member is of cylindrical shape having its axis in the horizontal direction.

16. A system as claimed in claim 1, wherein the pickup member is of cylindrical shape having its axis in the vertical direction.

17. A system as claimed in claim 1, wherein the resilient lines are of low modulus of elasticity and high resilience.

18. A system as claimed in claim 17, wherein the resilient lines are reinforced by fibers helically wound in at least two layers with their winding angle being in opposite directions and less than 57.74°, said angle gradually approaching zero at the end of the lines.

19. A system as claimed in claim 18, wherein a further reinforcement layer having an angle variable between $\alpha$ and 90° measured with respect to the axis of the resilient line is superposed on the end portion of the lines.

20. A system as claimed in claim 1, wherein the resilient lines are reinforced by fibers helically wound in a plurality of layers with their winding angle $\alpha$ being in opposite directions and less than 57.74°, said angle gradually approaching zero at the end of the lines.

21. A system as claimed in claim 20, wherein a further reinforcement layer having an angle between $\alpha$ and 90° measured with respect to the axis is superposed on the end portion of the lines.

22. A system as claimed in claim 21, wherein the reinforcement fibers are of materials having a high modulus elasticity.

23. A system as claimed in claim 20, wherein the reinforcement fibers are of materials having a high modulus elasticity.

24. A system as claimed in claims 1 or 20 or 21 or 23 or 18 or 19 or 22 wherein the resilient lines are fitted at their ends with terminations to which the reinforcement fibers and the hose wall are anchored.

25. A system as claimed in claim 1, wherein the mechanical connection to the pickup member is made by a universal joint.

26. A system as claimed in claim 1, wherein the mechanical connection to the pickup member is rigid, and is made by a flexible element of which the thickness reduces in a direction away from the pickup member and which is of flexural stiffness, said flexible element being fixed rigidly to the pickup member, the resilient line being contained within said flexible element.

27. A system as claimed in claim 26, wherein the reinforcement fibers are disposed at 0° and at 90° with respect to the axis of the resilient line in that portion of the resilient line contained within the flexible element, the winding angle passing gradually to the value $\alpha$ beyond the flexible element.

28. A system as claimed in claim 1, wherein the means for interrupting the communication between the resilient lines and the accumulation member is a shut-off cylinder which slides axially against the force of a reset spring to engage at the end of its stroke with a seal.

29. A system as claimed in claim 28, wherein the shut-off cylinder is operated by a pneumatic cylinder which is fed by the pressurized gas from the accumulation member by way of a circuit comprising a first preset non-return valve in open communication with the accumulation member, a pneumatic buffer vessel in open communication with the first preset non-return valve and the pneumatic cylinder, a solenoid valve in open communication with the pneumatic buffer vessel, a restriction in open communication with the solenoid valve and a second preset non-return valve connecting the restriction with the accumulation member, wherein the accumulation member pressurizes the pneumatic buffer vessel to a maximum value whereby the pneumatic buffer vessel operates the pneumatic cylinder against the force of the reset spring to operate the shut-off cylinder to reduce the flow opening to the turbine and into the accumulation member whereupon the pressurized gas returns to the accumulation member through the restriction and the second non-return valve, and the reset spring causes the shut-off cylinder to move in the reverse direction thereby increasing the flow opening to the turbine, the solenoid valve being provided to manually prevent the return of pressurized gas to the accumulation member thus allowing total closure to the shut-off cylinder.

30. A system as claimed in claim 1 wherein the axial turbine is fitted with blades, each of which is hinged on the axis which is normal to the axis of rotation of a rotor of said turbine and is disposed more forward than a hydrodynamic pressure center of the blade, each blade being subject to rotational restraint by a spring which, when external forces are absent, keeps the blade in a plane normal to the axis of rotation of the rotor.

31. A system as claimed in claim 30, wherein the blades are rotationally connected to the rotor by bearings and rigidly connected to the torsion bars which are connected at their other end to the rotor, said torsion bars act as springs.

32. A system as claimed in claim 1, further comprising a second low pressure accumulation member communicating with the first accumulation member, means for converting the pressure and kinetic energy of the incompressible liquid being disposed in the communication path between the two accumulation members, the low pressure accumulation member discharging incompressible liquid into the resilient lines when these are in a relaxed state, whereas when the resilient lines are in a state of tension feed of the incompressible liquid is into the first accumulation member.

* * * * *

UNITED STATES PATENT AND TRADEMARK OFFICE
CERTIFICATE OF CORRECTION

PATENT NO. : 4,531,063

DATED : July 23, 1985

INVENTOR(S) : Paolo Vielmo, et al.

It is certified that error appears in the above—identified patent and that said Letters Patent is hereby corrected as shown below:

On the cover sheet, directly after the listing of inventors, please insert:

--Assignee: Tecnomare, S.p.A., Venice, Italy--

Signed and Sealed this

Fourteenth Day of January 1986

[SEAL]

Attest:

DONALD J. QUIGG

Attesting Officer

Commissioner of Patents and Trademarks